United States Patent
Lechman et al.

[11] 3,898,459
[45] Aug. 5, 1975

[54] RADIOMETRIC METHOD OF MEASURING WEAR OF AN ENGINE COMPONENT

[75] Inventors: Donald C. Lechman, Warren; William J. Mayer, St. Clair Shores, both of Mich.

[73] Assignee: General Motors Corporation, Detroit, Mich.

[22] Filed: Nov. 19, 1973

[21] Appl. No.: 417,371

[52] U.S. Cl. ................. 250/303; 250/364; 250/492
[51] Int. Cl. .............................................. G01t 1/20
[58] Field of Search .......... 250/303, 358, 364, 432, 250/492; 7/64; 324/71 R

[56] References Cited
UNITED STATES PATENTS

| | | | |
|---|---|---|---|
| 2,751,506 | 6/1956 | Black et al. | 250/303 |
| 2,811,650 | 10/1957 | Wagner | 250/303 |
| 2,939,011 | 5/1960 | Bisso et al. | 250/364 |
| 2,957,986 | 10/1960 | Quigg | 250/303 |

*Primary Examiner*—Harold A. Dixon
*Attorney, Agent, or Firm*—Warren D. Hill

[57] ABSTRACT

The wear rate of an apex seal in a rotary combustion engine is measured by irradiating the seal with neutrons to render the seal radioactive, collecting the wear debris from the exhaust gas stream in a filter over a set period of engine operation and measuring the radioactivity of the debris on the filter. To prevent burning of the filter by the hot gases, the exhaust stream is cooled by injecting water into the exhaust stream. The seal material may include terbium oxide to enhance its radioactivity level.

4 Claims, 1 Drawing Figure

PATENTED AUG 5 1975  3,898,459
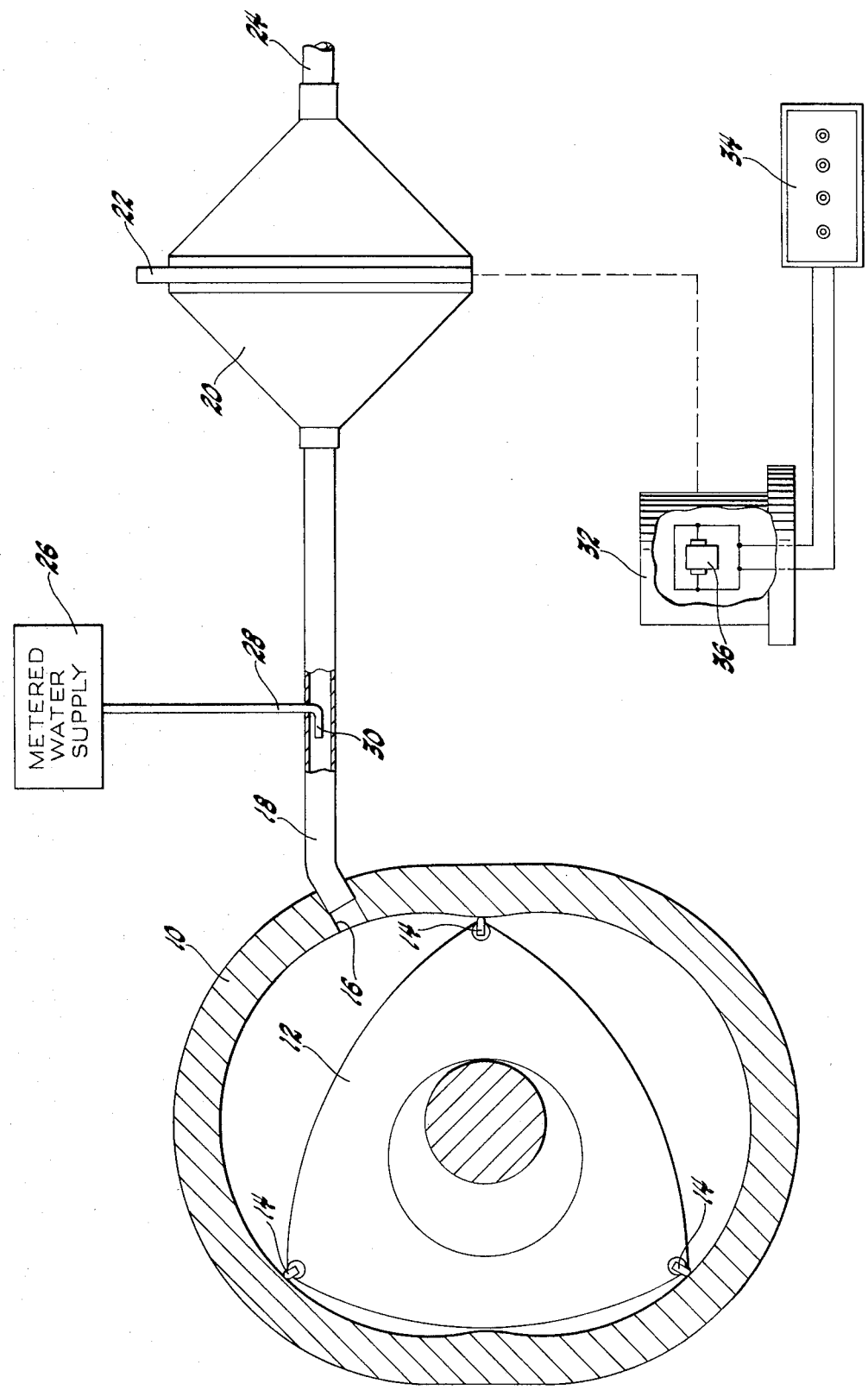

RADIOMETRIC METHOD OF MEASURING WEAR OF AN ENGINE COMPONENT

This invention relates to a radiometric method of measuring the wear rate of internal combustion engine parts wherein the wear debris is entrained in the engine exhaust gas.

It has previously been proposed by radiometrically measure the wear rate of an engine part by rendering the part radioactive and radiometrically determine the amount of wear debris accumulated in the engine oil. Where, however, the part being tested is so situated that the wear debris therefrom does not enter the engine oil, a different method must be devised. In particular, it is desirable in testing various compositions for use as an apex seal in a rotary combustion engine or in testing lubricants therefore to quickly measure the wear rate of the seal quickly for several different engine operating conditions. Wear debris from the apex seal becomes entrained in the engine exhaust stream so that it thus becomes necessary to collect and measure the amount of wear debris in the exhaust stream. High temperatures and high velocity of the exhaust stream along with the requirement that a low exhaust back pressure be maintained present difficulty in economically and efficiently collecting the wear debris.

It is therefore a general object of this invention to measure wear rate of a component in an internal combustion engine by collecting and measuring the wear debris in the engine exhaust stream.

It is another object of the invention to radiometrically measure the wear debris entrained in an engine exhaust stream.

It is a further object of the invention to radiometrically measure the wear rate of apex seals in a rotary combustion engine by collecting and measuring the wear debris entrained in the engine exhaust stream.

The invention is carried out by inducing radioactivity in the part under test by neutron irradiation, operating the part in an engine such that the wear debris is entrained in the engine exhaust stream, cooling the exhaust stream by injecting water into it, collecting the wear debris by a large filter and radiometrically measuring the collected wear debris on the filter. The invention further comprehends enhancing the radioactivity of the part by including in the material of the part a substance highly susceptible to being rendered radioactive by neutron irradiation.

The above and other advantages will be made more apparent from the following specification taken in conjunction with the accompanying drawings wherein like reference numerals refer to like parts and wherein:

The drawing is a schematic illustration of a rotary combustion engine connected with an apparatus for carrying out the method of measuring wear rate of a part of the engine according to the invention.

In the drawings, the rotary combustion engine is schematically illustrated as having a trochoid housing 10 and a rotor 12 therein, the rotor having three apices each retaining an apex seal 14 which bears against the housing 10 as the rotor turns within the housing. An exhaust port 16 is connected to an exhaust pipe 18 leading to a cassette holder 20 which flares outwardly in generally pyramidal form and then flares inwardly to terminate at an exhaust duct 24. A filter cassette 22 is removably contained in the cassette holder 20 at its largest diameter. A metered water supply 26 is connected to a water spray inlet tube 28 which enters the exhaust pipe 18 through a side wall thereof and terminates in a nozzle portion 30 comprising a one-eighth inch diameter stainless steel tube centered in the exhaust pipe and directed upstream of the exhaust gas stream. The drawing also depicts a scintillation detector 32 such as a well type NaI crystal detector and a scaler 34 for counting the output pulses of the detector 32. A sample vial 36 in the detector 32 holds filter material taken from cassette 22.

The method according to the invention comprises irradiating one or more of the apex seals with neutrons to render the seal material radioactive prior to assembly into the engine. The engine is them operated at a desired speed and load for a predetermined time such that as the apex seals wear, the wear debris is entrained in the exhaust gas stream and is collected on the filter medium. The exhaust gases are emitted from the exhaust port at temperatures varying between 1200° and 1700°F depending upon the speed and load of the engine. The filter medium in the cassette 22 would tend to char or burn under such hot exhaust gas conditions; accordingly, water is injected into the gas stream from nozzle 30 to cool the gases or at least to moisten the filter medium keeping it from becoming excessively hot.

At the end of the test run, the radioactivity of the wear debris collected by the filter is measured by folding or crumpling the filter material and placing it into the sample vial 36 wherein the activity of the wear debris is determined by counting the detector output pulses for a preset time. The total count over that time period is proportionate to the wear rate of the apex seal material. The count rate is correlated to wear rate by counting the activity of a small piece of radioactive seal material of known mass having the same specific activity as the seals under test.

In a specific example of the seal wear measurement method, a seal having the following composition was used:

| Element | Weight Percent |
|---|---|
| C | 48.1 |
| Al | 41.6 |
| Si | 5.89 |
| Ni | 0.92 |
| Fe | 0.48 |
| Cu | 0.40 |
| Mg | 0.17 |
| Cr | 0.01 |

The iron and chromium are the sources for the only useful isotopes for radiometric wear measurement. Since those elements are low in concentration, a long irradiation time (48 hours) at $10^{13}$ neutrons/cm²/s was required to build up the radioactive isotopes. For an apex seal of 6.34 g, this irradiation produced $1.8 \times 10^7$ disintegrations per second of activity. The seals were assembled in an engine which was connected to an exhaust and filter system constructed of stainless steel. The exhaust pipe 18 was a 2 inch diameter pipe that lead to the cassette holder 20 having 9 inch square maximum dimension. The cassette held 8.5 inch square chromatographic paper which served as a filter medium. This dimension was chosen to reduce the pressure drop across the filter element as much as possible while still allowing the filter (when sectioned in half) to be analyzed in a commercially available 1 inch well-type crystal scintillation detector 32. The chromatographic paper was Whatman 3M, 0.33 mm thick. The paper was placed between two thicknesses of cheesecloth to protect the paper from the metal edges of the cassette 22. The cheesecloth was also sectioned and analyzed with the paper. The paper was cooled by a stream of water that was injected through nozzle 30 into the exhaust gas against the flow before being blown back onto the paper. The rate of water flow was not critical, although a rate between 0.5 and 1 liters per minute was satisfactory.

With the engine operating at a desired speed and load, the cassette containing the chromatographic paper was placed in the collection system. After 3 minutes, the cassette was removed from the system and the paper removed from the cassette. After sectioning in half, each half of the paper and cheesecloth was inserted into sample vials 36 and the activity determined by the scintillation detector 32 and scaler 34. The cassette was then reloaded for an additional wear measurement at another engine operating condition. Generally nine data points at various speeds and loads are required. The total time for obtaining the nine measurements was 45 minutes, exclusive of the activity measurements. The activity measurement on each half of the filter required 10 minutes.

It has been found that the described method has a precision of ± 10 percent as judged by repeatability of the wear data. The method has been found to be useful in the evaluation of apex seal lubricants as well as the composition of the seal per se.

An improvement in the method comprises adding to the seal composition in the course of seal manufacture 0.5 percent by weight of terbium oxide. This substance is readily rendered radioactive by neutron irradiation and therefore enhances the activity of the seal. It has been found that the addition of the terbium oxide did not detract from the wear qualities of the seal while it produced the advantages of allowing a much shorter neutron irradiation time as well as reducing the activity measurement time of each filter half from 10 minutes to 3 minutes.

The invention has been described relative to the measurement to the wear rate of a seal in a rotary combustion engine, however, it will be recognized that the method is not limited to rotary combustion engines and may be applied to the wear measurement of any part where wear debris is entrained in an engine exhaust gas stream.

The embodiment of the invention described herein is for the purposes of illustration and the scope of the invention is intended to be limited only by the following claims:

What is claimed is:

1. The method of measuring the wear rate of a part in an engine, the wear debris of which is entrained in the exhaust gas stream of the engine comprising
   inducing radioactivity in the part to be monitored by irradiating the part with neutrons,
   assembling the part into an engine,
   operating the engine for a predetermined time period whereby wear of the part releases radioactive wear debris into the engine exhaust gas stream,
   collecting the wear debris on a filter medium in the exhaust gas stream, the filter medium being subject to rapid deterioration of filtering properties when exposed to a hot exhaust gas stream
   cooling the exhaust gas stream by injecting water into the stream upstream of the filter medium for preventing deterioration of the filter medium due to high exhaust gas temperature,
   and measuring the radioactivity of the wear debris collected by the filter medium, whereby the activity level is indicative of the wear rate.

2. The method of measuring the wear rate of a part in an engine, the wear debris of which is entrained in the exhaust gas stream of the engine comprising
   doping the part to be monitored with a tracer substance susceptible to being rendered radioactive by neutron irradiation,
   inducing radioactivity in the part to be monitored by irradiating the part with neutrons,
   assembling the part into an engine,
   operating the engine for a predetermined time period whereby wear of the part releases radioactive wear debris into the engine exhaust gas stream,
   collecting the wear debris on a filter medium in the exhaust gas stream, the filter medium being subject to rapid deterioration of filtering properties when exposed to a hot exhaust gas stream
   cooling the exhaust gas stream by injecting water into the stream upstream of the filter medium for preventing deterioration of the filter medium due to high exhaust gas temperature,
   and measuring the radioactivity of the wear debris collected by the filter medium, whereby the activity level is indicative of the wear rate.

3. The method of measuring the wear rate of a part in an engine, the wear debris of which is entrained in the exhaust gas stream of the engine comprising,
   including in the composition of the part to be monitored a tracer substance comprising on the order of 0.5% by weight of terbium oxide,
   inducing radioactivity in the part to be monitored by irradiating the part with neutrons,
   assembling the part into an engine,
   operating the engine for a predetermined time period whereby wear of the part releases radioactive wear debris into the engine exhaust gas stream,
   collecting the wear debris on a filter medium in the exhaust gas stream,
   cooling the exhaust gas stream by injecting water into the stream upstream of the filter medium for preventing deterioration of the filter medium due to high exhaust gas temperature,
   and measuring the radioactivity of the wear debris collected by the filter medium, whereby the activity level is indicative of the wear rate.

4. The method of measuring the wear rate of an apex seal in a rotary engine comprising
   including in the seal a substance susceptible to being rendered radioactive by neutron irradiation,
   inducing radioactivity in the seal by irradiating the seal with neutrons,
   assembling the seal into a rotary engine,
   operating the engine for a predetermined time period whereby wear of the seal releases radioactive wear debris into the engine exhaust gas stream,
   collecting the wear debris on a filter medium in the exhaust gas stream, the filter medium being subject to rapid deterioration of filtering properties when exposed to a hot exhaust gas stream
   cooling the exhaust gas stream by injecting water into the stream upstream of the filter medium for preventing deterioration of the filter medium due to high exhaust gas temperature,
   and measuring the radioactivity of the wear debris collected by the filter medium, whereby the activity level is indicative of the wear rate.

* * * * *